2,806,832
SHELL MOLDING COMPOSITIONS AND PROCESS FOR PREPARING SAME

Manuel F. Drumm, Springfield, and William D. Burke, West Springfield, Mass., assignors to Monsanto Chemical Company, St. Louis, Mo., a corporation of Delaware No Drawing. Application May 19, 1954, Serial No. 430,986

9 Claims. (Cl. 260—38)

This invention relates to compositions for use in the preparation of shell molds. More particularly, this invention relates to modified shell molding compositions and to a process for preparing the same.

Shell molds are used in the casting of metal. The molds are formed from mated sections comprising thin "shells" of sand bonded with a thermosetting material, the shells having a thickness of about 0.1–1.5 or more inches. Shell molds are normally backed up with a suitable reinforcing material such as steel shot during metal casting operations in order to insure accurate metal tolerances.

The individual shell sections are prepared by bringing a large excess of a shell molding composition comprising a flowable mixture of sand and binder into contact with a heated metal pattern. The heat from the pattern will fuse that portion of the binder in proximity thereto in order to form a lightly adherent shell on the pattern. The time of contact and the temperature of the pattern will determine the thickness of the shell. After a shell of the desired thickness has had time to build up, the excess sand-binder mixture is flowed from the pattern and the pattern and adherent shell are then baked in order to advance the binder to final hardness. Finally, the hardened shell is stripped from the pattern preparatory to assembly and metal casting operations.

Phenolic resins are commercially available in dry powdered form and in the past it has been conventional practice to prepare shell molding compositions by intimately blending such dry powdered resins with a suitable sand. However, the use of such blends has not been entirely satisfactory for one reason or another, particular difficulty having been encountered with respect to segregation of the resin from the sand subsequent to blending operations. In addition, comparatively large amounts of the dry powdered resin must be used if shell molds having satisfactory bake strength are to be obtained.

Phenolic resins are also available in the form of flowable liquid resin compositions which contain about 30–95% or more by weight of resin, the remaining portion of the composition consisting largely of a compatible diluent such as water or an organic solvent (e. g., a lower aliphatic alcohol). These resin compositions are commonly referred to as "liquid" resins when the diluent consists essentially of water and as resin "solutions" when the diluent is an organic solvent. Such liquid resin compositions can be mixed with sand and then dried so that the resin will form a thin coating about the individual sand grains. Consequently, no problem exists as to resin segregation when liquid resin compositions are blended with sand. However, the resultant blends usually possess appreciable green strength. That is to say, the mixtures will not flow with ease and will tend to agglomerate within a matter of hours after preparation. Sand-resin agglomerates of this nature can be broken up only with difficulty. Consequently, for these and other reasons the liquid phenolic resin compositions have been generally unsatisfactory for use in the preparation of free-flowing shell molding compositions.

It is an object of the present invention to provide substantially permanently free-flowing compositions derived from sand and a liquid phenolic resin composition.

Another object is the provision of shell molding compositions having improved flowability and bake strength properties.

A further object is the provision of a process for preparing shell molding compositions.

These and other objects are attained by intimately blending sand with a suitable amount of a liquid phenolic resin composition and with a minor amount of an amide having the formula R—CO—NHR', wherein R is an alkyl radical having 1–5 carbon atoms and R' is an alkyl radical having 14–18 carbon atoms.

The following examples are given in illustration and are not intended as limitations on the scope of this invention. Where parts are mentioned, they are parts by weight.

EXAMPLE I

Cold blending method

At room temperature and in any suitable mixing apparatus, such as a conventional muller, intimately blend about 100 parts of #60 Ottawa sand with about 0.4 part of hexamethylene tetramine. When the materials are homogeneously blended, add thereto about 5 parts of a 60% solids ethanol solution of a permanently fusible phenol-formaldehyde resin, such resin having been prepared by reacting 1 mol of phenol with about 0.75 mol of formaldehyde. Continue mulling until the resultant mixture begins to "ball" into sticky agglomerates. At this point, add about 0.1 part of hexadecyl acetamide and continue mulling until a free-flowing mixture is obtained. The resultant composition, hereinafter referred to as Composition 1, has excellent flowability characteristics, is substantially freee from green strength and can be used to prepare shell molds having high bake strength. The mixture of resin, hexamethylene tetramine and hexadecyl acetamide is present in the composition in the form of a homogeneous coating on the individual grains of sand.

Prepare a second composition (Composition 2) containing the ingredients of Example I in the same proportions, but in this instance conjointly blend the hexadecyl acetamide with the sand and hexamethylene tetramine prior to the addition of the phenolic resin solution. As in Example I, mixing should be continued until a free-flowing composition is obtained. This composition is substantially free from green strength and can be used to prepare shell molds having high bake strength. The flowability characteristics of Composition 2, however, are not as good as the flowability characteristics of Composition 1. Again, the individual sand grains are homogeneously coated with the mixture of resin, hexamethylene tetramine and hexadecyl acetamide.

When the hexadecyl acetamide is eliminated from the formulation of Example I and the example is otherwise repeated, the resultant composition (Composition 3) does not become completely free-flowing even with prolonged mixing and, additionally, possesses appreciable green strength. This composition will form into hard agglomerates within a matter of hours and, as a result, is essentially unsuitable for use in the preparation of shell molding compositions. Shell molds are prepared from Composition 3 only with difficulty and even when prepared will have inferior bake strength as compared with shell molds prepared from Compositions 1 and 2.

The flowability and bake strength properties of Compositions 1–3 are summarized in the following table. Tensile strength was determined by forming a plurality of briquettes ¼ inch thick from each of the compositions in a pattern heated to a temperature of about 400° F. The thus-formed briquettes were baked in an oven at a temperature of about 600° F. for about 2 minutes, cooled, and then tested for tensile strength in a dead-weight type tensile strength testing machine.

TABLE I.—PHYSICAL PROPERTIES OF COMPOSITIONS 1-3

| Composition | Flowability | Average bake strength, p. s. i. |
| --- | --- | --- |
| 1 | Best | 536 |
| 2 | Intermediate | 535 |
| 3 | Unsatisfactory | 341 |

EXAMPLE II

Hot blending method

In a suitable mixing apparatus, such as a high speed muller, blend the following ingredients at a temperature of about 250° F. First, intimately, blend about 100 parts of #60 Ottawa sand, 0.4 part of hexamethylene tetramine and about 0.1 part of hexadecyl acetamide. Then, with continued mulling, add about 3 parts of an essentially oganic solvent-free liquid permanently fusible phenol-formaldehyde resin composition containing about 15% by weight of water, such resin having been prepared by reacting about 0.75 mol of formaldehyde with one mol of phenol. After addition of the resin composition, the mixture will become tacky. Continue mulling until a sample taken from the muller will become free-flowing when cooled to room temperature. At this point, the mulling may be terminated and the mixture cooled in order to obtain a free-flowing shell molding composition (Composition 4). This composition has superior flowability characteristics, being soft and velvety to the touch. It is much superior in this respect as compared with Compositions 1 and 2. Composition 4 is substantially free from green strength and may be used to prepare shell molds having satisfactory bake strength. The mixture of resin, hexamethylene tetramine and hexadecyl acetamide is present as a homogeneous coating on the individual grains of sand.

Prepare a further composition containing the ingredients of Example II in the same proportions by blending the materials at a temperature of 250° F. but in this instance, blend the sand with the hexamethylene tetramine and then add the liquid phenolic resin and the hexadecyl acetamide. The resultant composition (Composition 5) has good flowability properties, the flowability of this composition being substantially equal to the flowability of Composition 4. Shell molds prepared from Composition 5 will have an even higher bake strength than shell molds prepared from Composition 4. The sand grains of Composition 5 will be homogeneously coated with the mixture of resin, hexamethylene tetramine and hexadecyl acetamide.

When the hexadecyl acetamide is eliminated and Example II is otherwise repeated in the described manner, there is obtained a composition (Composition 6) which possesses substantial green strength. This material is essentially unsuitable for use in the preparation of shell molds since it agglomerates within a matter of hours after preparation. Shell molds are prepared only with difficulty and even when prepared are found to have inferior bake strength as compared with Compositions 4 and 5. The properties of Compositions 4-6 are summarized in the following table. Tensile strength was determined by the method used in testing Compisitions 1-3.

TABLE II.—PHYSICAL PROPERTIES OF COMPOSITIONS 4-6

| Composition | Flowability | Average tensile strength, p. s. i. |
| --- | --- | --- |
| 4 | Superior | 334 |
| 5 | do | 398 |
| 6 | Unsatisfactory | 273 |

In preparing shell molding compositions in accordance with the present invention, any foundry sand which is suitable for shell molding purposes may be used, although mixing time and resin requirements will generally vary somewhat from sand to sand.

The amides to be used in accordance with the present invention have the general formula R—CO—NHR' wherein R is an alkyl radical having 1-5 carbon atoms and R' is an alkyl radical having 14-18 carbon atoms. Illustrative of the amides of this class which may be used alone or in admixture with one another are tetradecyl acetamide, hexadecyl acetamide, octadecyl acetamide, hexadecyl propionamide, hexadecyl butyramide, octadecyl propionamide, hexadecyl formamide, etc. The amides need not be used in pure form and technical grades can be used with satisfactory results.

The phenolic resin to be used in accordance with the present invention may comprise a one-stage (i. e., heat-hardenable) resin, a permanently fusible resin or a mixture thereof. A wide variety of processes can be used to prepare phenolic resins of the above nature. For example, the one-stage resins are commonly prepared by reacting about 0.7–2 mols of formaldehyde with each mol of phenol under alkaline conditions and the permanently fusible resins are commonly prepared by reacting each mol of phenol with less than an equimolar amount of formaldehyde under acid conditions. All or a part of the formaldehyde may be replaced by an equivalent amount of a polymer thereof such as paraformaldehyde, trioxymethylene, etc. All or a part of the phenol may also be replaced by an equimolar amount of one or more other mono- or polyhydroxy benzenes. Representative of the mono- and polyhydroxy benzenes that can be used for this purpose are cresols, xylenols, resorcinol, phloroglucinol, etc. Somewhat better flowability is obtained if the shell molding compositions of the present invention are prepared from permanently fusible phenolic resins. The permanently fusible phenolic resins are rendered heat-hardenable when used in conjunction with a hardening agent such as hexamethylene tetramine, paraformaldehyde, etc. and, accordingly, when permanently fusible resins are used, a hardening agent should be present in the shell molding composition in an amount sufficient to set and harden the resin. Normally, about 10–15 parts of hardening agent are required for each 100 parts of the resin.

As has been indicated, the phenolic resins should be used in the form of liquid resin compositions containing 30% or more by weight of resin, the remainder of the composition consisting essentially of a compatible diluent such as water or an organic solvent. When the resin composition is essentially free from organic solvents and the diluent is water, the water should preferably comprise not more than about 20% of the liquid resin composition. If the resin is a one-stage resin of a sufficiently low order of condensation, the water may even comprise less than about 5% of the total weight of the composition. On the other hand, if the phenolic resin is dissolved in an organic solvent such as methanol, ethanol, isopropanol, butanol, acetone, etc., the solution should preferably contain about 30–80% by weight of resin. The amount of liquid resin composition to be used should be determined on the basis of resin content rather than on the basis of the total weight of the liquid composition.

Shell molding compositions having the most satisfactory properties are obtained if the ingredients are proportioned so that about 1–5 parts of phenolic resin are present for each 100 parts of sand. Generally speaking, the amount of amide to be used should be determined on the basis of phenolic resin content and about 1½ to 5 parts of amide should be used for each 100 parts of phenolic resin present in the shell molding composition. If substantially more than about 5 parts of amide per 100 parts of phenolic resin are used, the properties of the resultant shell molding compositions are impaired, rather than improved. Thus, for example, a shell molding composition containing 10 parts of hexadecyl acetamide per 100 parts of phenolic resin will have bake strength properties equivalent to or lower than the bake strength properties of amide-free shell molding compositions.

In accordance with a modified form of the present invention, the phenolic resin component of the shell molding composition may comprise both a dry powdered phenolic resin and a liquid resin composition, at least 50% of the resin being in liquid form. If the modified process is to be used, it is preferable that the liquid resin composition be blended with the sand prior to the addition of the powdered phenolic resin. The liquid resin composition is preferably either a one-stage phenolic resin of a low order of condensation which contains less than about 10% by weight of water or an organic solvent solution of a permanently fusible phenolic resin. The dry powdered resin should preferably be a permanently fusible phenolic resin which has been premixed with the hardening agent therefor prior to addition to the pre-blend of sand and liquid phenolic resin composition.

Shell molding compositions may be prepared in accordance with the present invention by either the so-called "cold" mixing process or by the "hot" mixing process. It may be said that the ingredients are blended by the cold method when they are mixed while at a temperature of about 50–150° F. In accordance with the hot blending method, the materials are blended while at a temperature of above 150° F. and, preferably, while at a temperature of about 240–280° F. The materials should not be heated to a temperature in excess of about 350° F. during the mixing operation in order to avoid premature set-up of the resin. The blending method to be used will, in part, be dependent on the nature of the liquid phenolic resin composition. Thus, the liquid water-containing one-stage phenolic resin compositions are easily blended by the cold method but can be blended by the hot method only under carefully controlled conditions and with the use of a short mixing cycle. On the other hand, water-containing liquid resin compositions which are of the permanently fusible type are preferably blended by the hot method and can be blended only with difficulty if the cold blending method is used. When the phenolic resin is used in the form of an organic solvent solution thereof, such solution is easily blended with the sand and amide by either the cold method or the hot method.

Generally satisfactory results are obtainable by either the hot or cold method irrespective of the order of addition of the various ingredients. However, for best results it is preferable to regulate the order of addition in order to obtain the best results. When the cold blending method is to be employed, the best flowability characteristics are obtained by pre-blending the sand and liquid resin composition and by delaying addition of the amide to the pre-blend until after agglomeration has commenced. Blending by the cold method should be continued after addition of the amide until a free-flowing mixture is obtained. If the hot method is to be used, for the sake of convenience, it is sometimes preferable to pre-blend the sand and amide prior to the addition of the liquid resin composition. However, in order to improve the bake strength properties of shell molding compositions prepared by the hot method, the amide should be added to the sand conjointly with or subsequent to the addition of the liquid resin composition. Blending by the hot method should be continued until a sample of the mixture is free-flowing when cooled to room temperature.

The shell molding compositions prepared in accordance with the present invention are sometimes referred to as "coated sands" since the mixture of phenolic resin, amide and hardening agent (if such is used) is present in the form of a homogeneous coating on the individual grains of sand.

Shell molds are easily prepared from the molding compositions of the present invention. When forming molds by conventional methods an excess of the shell molding composition is placed in an open-topped mold box which is then closed with a metal pattern heated to a temperature of about 400–500° F. The box is then over turned so that the shell molding composition is brought into contact with the pattern by gravity flow. After a shell of the desired thickness has had time to build up, the box is righted so that the excess of sand-binder mixture flows from the pattern. The shell should be baked in an oven for a short period of time at a temperature of about 600–1000° F. before being stripped from the pattern. It is also possible to apply the compositions of the present invention to a heated pattern by the so-called "blowing" process wherein the composition is forced into contact with the pattern by air pressure. If it is attempted to "blow" shell molds with conventional mixtures of sand and powdered phenolic resin, it is generally found that severe resin segregation occurs so that a weak, non-homogeneous shell is obtained.

What is claimed is:

1. A free-flowing shell molding composition comprising an intimate blend of about 100 parts by weight of sand, about 1–5 parts by weight of phenolic resin solids and about 1.5–5%, based on the weight of the phenolic resin of an amide, said resin and said amide being present in said composition in admixture as a homogeneous coating on the individual sand grains, said phenolic resin being taken from the group consisting of (1) one-stage resins prepared by reacting 0.7–2 mols of formaldehyde with 1 mol of phenol under alkaline conditions and (2) permanently fusible resins prepared by reacting 1 mol of phenol with less than 1 mol of formaldehyde under acid conditions, said amide having the formula R—CO—NHR', wherein R is an alkyl radical having 1–5 carbon atoms and R' is an alkyl radical having 14–18 carbon atoms.

2. A composition as in claim 1 wherein the phenolic resin is a one-stage phenol-formaldehyde resin prepared by reacting 0.7–2 mols of formaldehyde with 1 mol of phenol under alkaline conditions and the amide is hexadecyl acetamide.

3. A composition as in claim 1 wherein the phenolic resin is a permanently fusible resin prepared by reacting 1 mol of phenol with less than 1 mol of formaldehyde, and the amide is hexadecyl acetamide and wherein the composition contains additionally a hardening agent in an amount sufficient to set and harden the phenolic resin, said hardening agent being a member of the group consisting of hexamethylene tetramine and paraformaldehyde.

4. A process for preparing a free-flowing coated sand composition which comprises mixing at 50–350° F., about 100 parts by weight of sand, about 1–5 parts by weight of a phenolic resin dissolved in a solvent taken from the group consisting of water and organic liquids which are solvents for the phenolic resin and 1½–5% based on the weight of the phenolic resin of an amide having the formula R—CO—NHR', wherein R is an alkyl radical having 1–5 carbon atoms and wherein R' is an alkyl radical having 14–18 carbon atoms, said phenolic resin being taken from group consisting of (1) one-stage resins prepared by reacting 0.7–2 mols of formaldehyde with 1 mol of phenol under alkaline conditions and (2) permanently fusible resins prepared by reacting 1 mol of phenol with less than 1 mol of formaldehyde under acid conditions, and thereafter cooling the mixture without curing the resin.

5. A process as in claim 4 wherein the temperature is limited to 50–150° F., the sand and phenolic resin solution are blended to the point of agglomeration and thereafter the amide is added to the blend and mixing is continued until the resultant composition is free flowing.

6. A process as in claim 4 wherein the mixing temperature is limited to 150–350° F.

7. A process as in claim 4 wherein the phenolic resin is a one-stage resin and the amide is hexadecyl acetamide and the solvent is water.

8. A process as in claim 4 wherein the phenolic resin is a one-stage phenol-formaldehyde resin, the amide is hexadecyl acetamide and the solvent is an organic liquid which is a solvent for the phenolic resin.

9. A process as in claim 4 wherein the phenolic resin is a permanently fusible phenol-formaldehyde resin, the amide is hexadecyl acetamide, the solvent is ethanol and a hardener from the group consisting of hexamethylene tetramine and paraformaldehyde is added in an amount sufficient to set and harden the permanently fusible resin.

References Cited in the file of this patent

UNITED STATES PATENTS 2,662,067  Less et al. _____ Dec. 8, 1953